United States Patent
Wiedmeyer et al.

(10) Patent No.: US 6,364,923 B1
(45) Date of Patent: Apr. 2, 2002

(54) METHOD AND APPARATUS FOR THE CLEAN REPLACEMENT OF CONTAMINATED HEPA FILTERS

(75) Inventors: Stanley G. Wiedmeyer, Glen Ellyn; Arthur A. Frigo, Downers Grove; Daniel Preuss, Hinsdale; Edward F. Bielick, Darien; Richard F. Malecha, Naperville, all of IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 09/616,419

(22) Filed: Jul. 14, 2000

(51) Int. Cl.$^7$ ............................................. B01D 50/00
(52) U.S. Cl. ................ 55/385.2; 55/502; 55/DIG. 18; 55/DIG. 46; 454/187
(58) Field of Search .......................... 55/385.1, 385.2, 55/DIG. 18, DIG. 46, 502, 506; 454/187

(56) References Cited

U.S. PATENT DOCUMENTS

| | | | | |
|---|---|---|---|---|
| 3,035,315 A | * | 5/1962 | Saunders | 55/DIG. 18 |
| 3,363,532 A | * | 1/1968 | Horneff | 454/187 |
| 3,766,844 A | * | 10/1973 | Donnelly et al. | 55/385.2 |
| 4,747,857 A | * | 5/1988 | Andrews | 55/385.2 |
| 4,804,392 A | * | 2/1989 | Spengler | |
| 5,837,040 A | * | 11/1998 | Caughron et al. | |
| 6,102,977 A | * | 8/2000 | Johnson | |
| 6,149,699 A | * | 11/2000 | Grantham | |

* cited by examiner

Primary Examiner—David A. Simmons
Assistant Examiner—Minh-Chan T. Pham
(74) Attorney, Agent, or Firm—Joan Pennington

(57) ABSTRACT

A method and apparatus are provided for the replacement of contaminated HEPA filters without contamination of the surrounding environment. A filter housing is generally cylindrical and defines a filter receiving cavity. The filter housing having a filter receiving end and a filter removing end. An active HEPA filter is received within the filter housing cavity and is located near the filter removing end. A backup HEPA filter is received within the filter housing cavity and is located near the filter receiving end. A change-out bag is received within the filter housing cavity and is located adjacent to the filter removing end. The filter housing includes a gas flow path through the active HEPA filter without passing through the backup HEPA filter. For the replacement of contaminated HEPA filter, end covers are removed from the filter receiving end and the filter removing end of the filter housing and the change-out bag is opened. The backup HEPA filter is pushed into position of the active HEPA filter, thereby moving the active contaminated HEPA filter into the change-out bag during filter replacement. The change-out bag is sealed to isolate the HEPA filter for disposal.

20 Claims, 5 Drawing Sheets

METHOD AND APPARATUS FOR THE CLEAN REPLACEMENT OF CONTAMINATED HEPA FILTERS

The United States Government has rights in this invention pursuant to Contract No. W-31-109-ENG-38 between the United States Government and Argonne National Laboratory.

FIELD OF THE INVENTION

The present invention relates to a method and apparatus for the replacement of contaminated high efficiency particulate air (HEPA) filters, and more particularly relates to a method and apparatus for the replacement of contaminated HEPA filters without contamination of the surrounding environment.

DESCRIPTION OF THE RELATED ART

High efficiency particulate air (HEPA) filters are widely used in the nuclear, pharmaceutical, medical, and microelectronics industries for the removal of microscopic contaminants from exhaust gases. For example, HEPA filters may be found in any glovebox containing radioactive or other hazardous materials. HEPA filters were first used by the nuclear industry over 40 years ago and were typically placed in a square wooden container fitted into the exhaust ducting. Current installations have not changed much from this early design. Such filters must be replaced periodically to maintain filtering efficiency.

A problem with the conventional type of installation is that, for nuclear and other hazardous applications, when it becomes necessary to change out the filter, generally every year or two, it is a difficult, time consuming, and expensive process. Typically the change-out of a contaminated filter involves opening the filter housing, removing the dirty filter into a change-out bag, replacing the contaminated filter with a clean filter and resealing the housing. The area where the change-out takes place may be sealed during the change-out, or the surrounding area must be decontaminated after change-out, before normal activities can be resumed. Several attempts have been made to develop systems for the clean bag-out of contaminated filters, but so far, none have found wide-spread acceptance in the industry.

A need exists for a method and apparatus for the replacement of contaminated HEPA filters without contamination of the surrounding environment.

It is an object of the invention to provide an improved method and apparatus for the replacement of contaminated HEPA filters.

It is another object of the invention to provide an improved method and apparatus for the replacement of contaminated HEPA filters without contamination of the surrounding environment.

It is another object of the invention to provide an improved method and apparatus for the replacement of contaminated HEPA filters substantially without negative effect and that overcome many of the disadvantages of prior arrangements.

SUMMARY OF THE INVENTION

In brief, a method and apparatus are provided for the replacement of contaminated HEPA filters without contamination of the surrounding environment. A filter housing is generally cylindrical and defines a filter receiving cavity. The filter housing has a filter receiving end and a filter removing end. An active HEPA filter is received within the filter housing cavity and is moved to a location near the filter removing end. A backup HEPA filter is received within the filter housing cavity and is located near the filter receiving end. A change-out bag is sealed to the filter housing and is stored in the filter housing cavity adjacent to the filter removing end. The filter housing allows a gas to flow through the active HEPA filter without passing through the backup HEPA filter. After a period of operation, the active filter becomes contaminated.

For the replacement of a contaminated HEPA filter, flow valves are closed, then end covers are removed from the filter receiving end and the filter removing end of the filter housing and the change-out bag is opened. A new HEPA filter is used to push the backup HEPA filter into the position of the active HEPA filter, thereby pushing the contaminated HEPA filter into the change-out bag during filter replacement. The change-out bag is then sealed to isolate the contaminated HEPA filter for disposal. The old backup HEPA filter is now the active filter, and the new HEPA filter becomes the backup.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
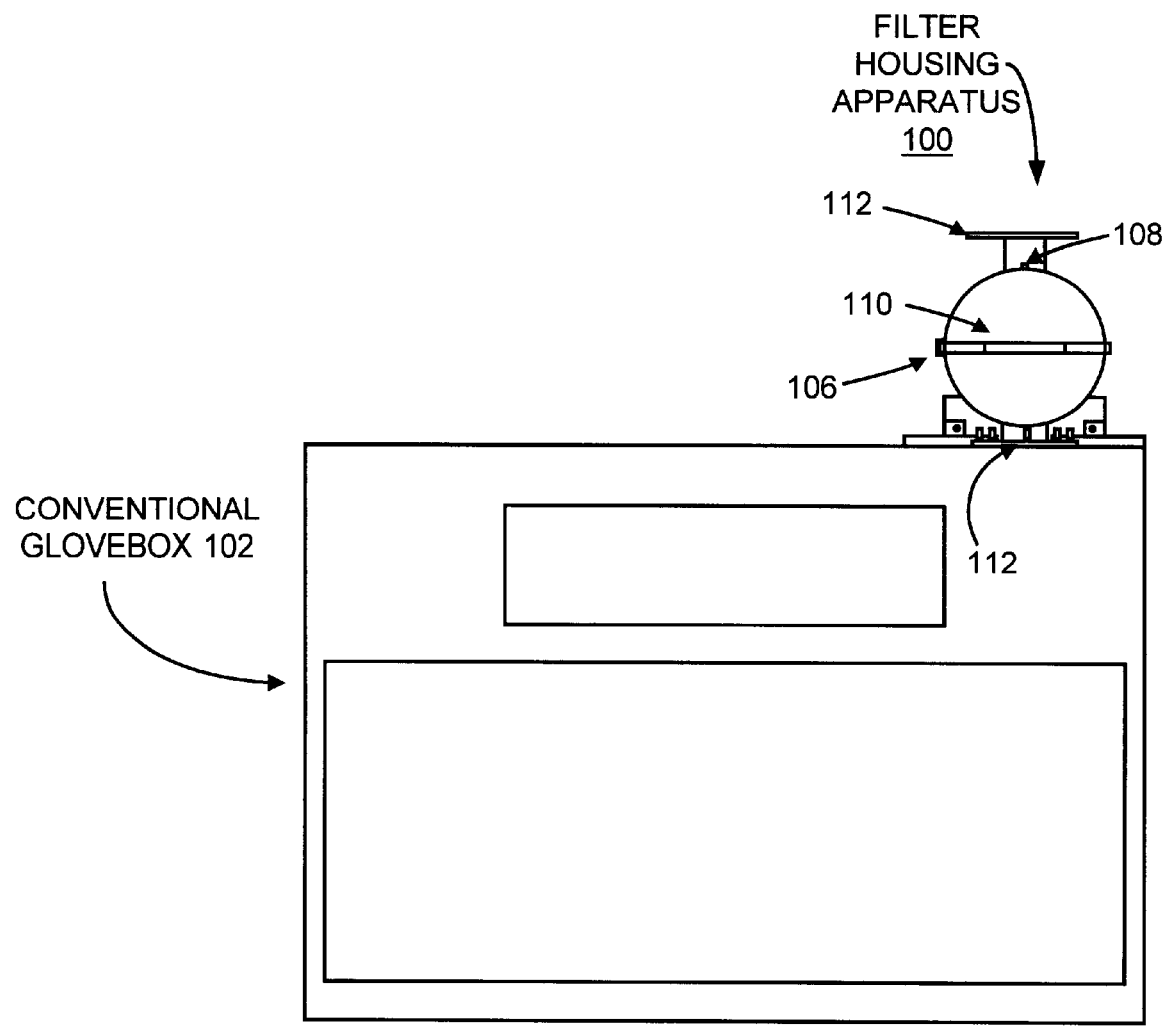
FIG. 1A is a front view of a HEPA filter housing apparatus in accordance with the preferred embodiment shown in an environment of use.
Figure 1B:
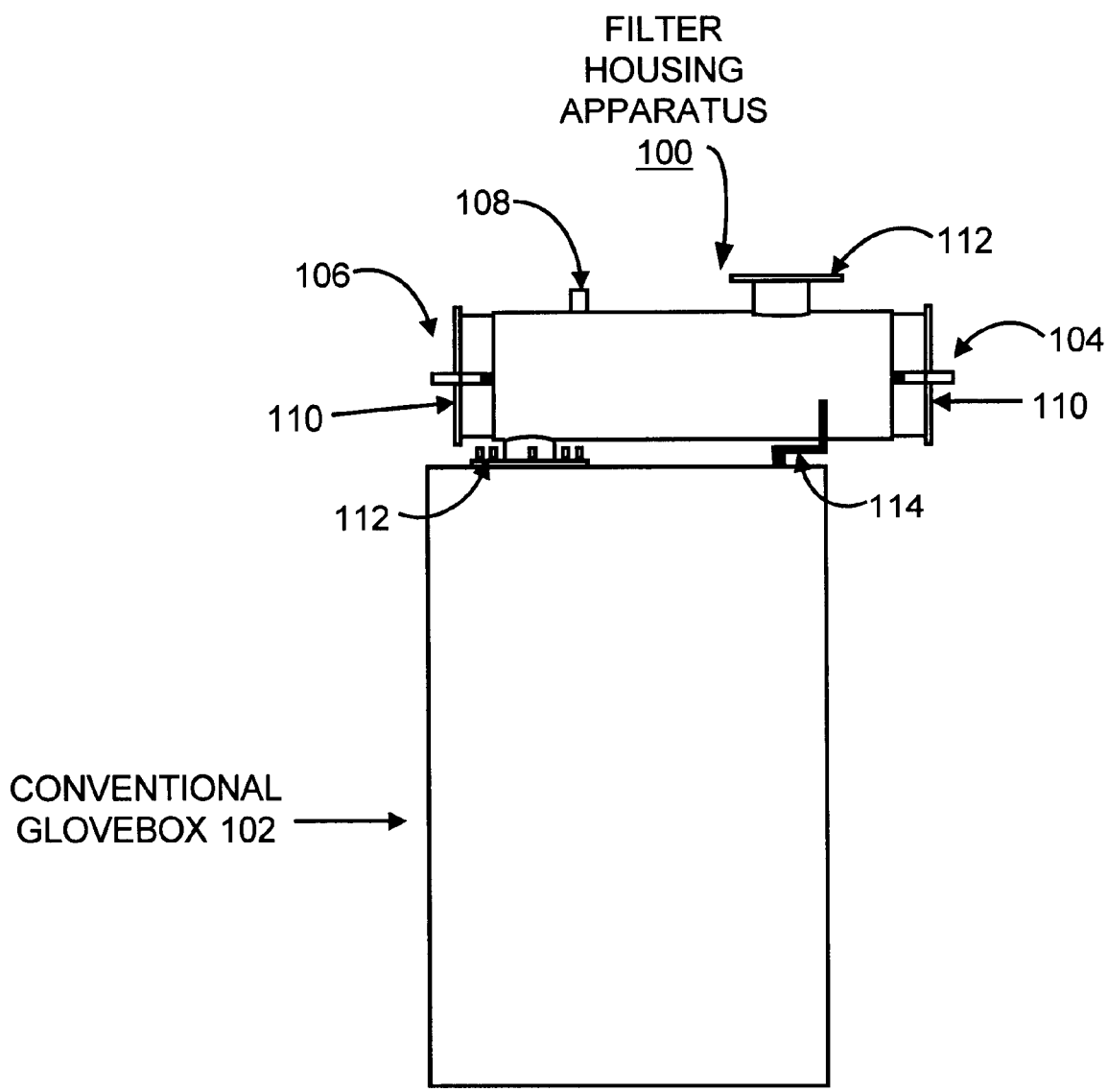
FIG. 1B is a side view of the HEPA filter housing apparatus of FIG. 1 housing in accordance with the preferred embodiment shown in an environment of use.

Having reference now to the drawings, FIGS. 1A and 1B illustrate a HEPA filter housing apparatus in accordance with the preferred embodiment generally designated by the reference character 100. In FIGS. 1A and 1B, HEPA filter housing apparatus 100 is shown in an example environment of use. HEPA filter housing apparatus 100 is a cylindrical filter housing shown mounted on a conventional glovebox 102. HEPA filter housing apparatus 100 includes a filter install end 104 and a filter removal end 106. A test aerosol introduction port 108 is provided near the filter removal end 106 that allows the filter integrity to be tested while the filter is active. A pair of protective end covers 110 are provided for both the filter install end 104 and the filter removal end 106. The protective end covers 110 can be removed without exposing the operator or environment to potential contamination. HEPA filter housing apparatus 100 includes a pair of standard size mounting flanges 112 for installation onto existing filtration ducting. HEPA filter housing apparatus 100 includes a support member 114 for mounting to the glovebox 102.

In accordance with features of the preferred embodiment, HEPA filter housing apparatus 100 of the preferred embodiment allows HEPA filters to be installed and removed externally from enclosures, such as gloveboxes 102 and isolation hoods. HEPA filter housing apparatus 100 is arranged to facilitate reduced filter change-out time, improved safety and ease of handling, lower cost, cleanliness, and waste minimization. Multiple filters are contained within the HEPA filter housing apparatus 100.

Figure 2:
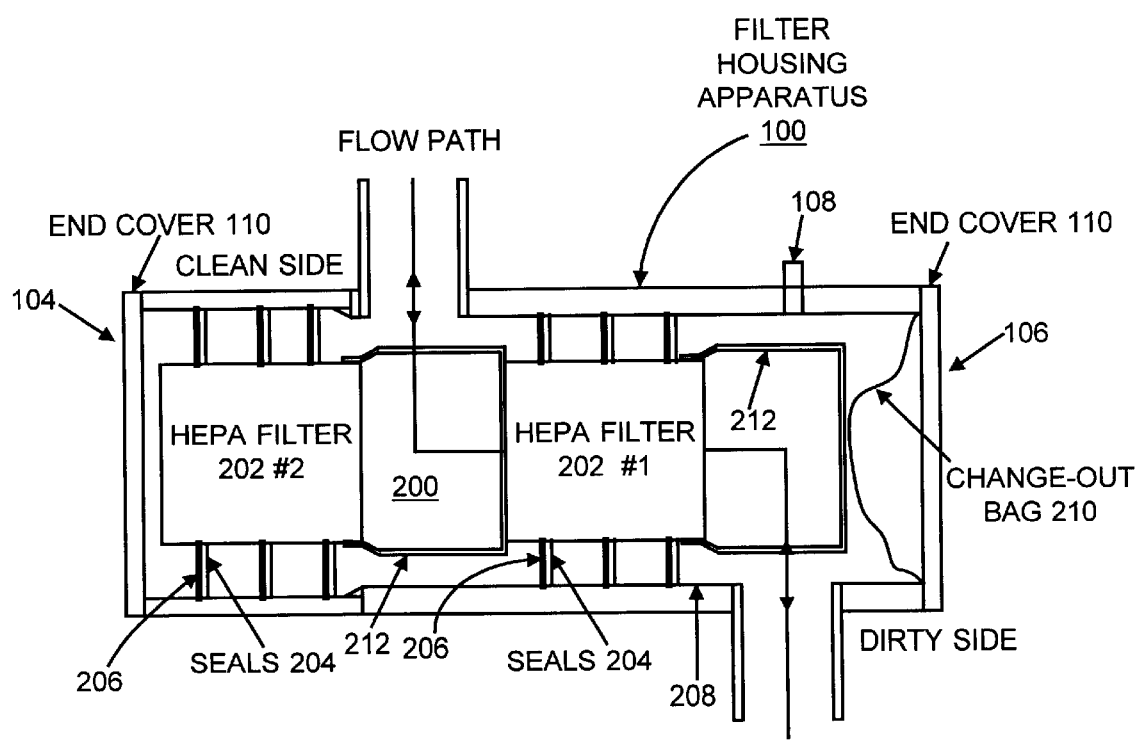
FIG. 2 is a diagrammatic view of the HEPA filter housing apparatus of FIG. 1 illustrating normal operation in accordance with the preferred embodiment.

Referring to FIG. 2, HEPA filter housing apparatus 100 defines an interior filter receiving cavity 200 of sufficient length to hold at least a pair of cylindrical HEPA filters 202 in tandem. In FIG. 2, the active HEPA filter 202 is shown as HEPA filter 202 #1. HEPA filter 202 #1 is in position to actively filter the air or other gas being utilized. A clean, backup HEPA filter 202 is shown as HEPA filter 202 #2. HEPA filter 202 #2 is stored in the housing apparatus 100 and is ready to be pushed into position to become active when filter replacement occurs. HEPA filters 202 include a plurality of cylindrical seals 204 extending between each filter 202 and an interior wall 208 of the housing apparatus 100. Each of the HEPA filters 202 is a cylindrical HEPA type that can be easily compacted for waste disposal. HEPA filter seals 204 are added to the commercially available filters 202. HEPA filter seals 204 prevent gas flow from bypassing the filters 202. HEPA filter seals 204 are easily fabricated from elastomer material sheets and provide uncompromising quality for protection of the worker and the environment. When installed, the HEPA filter seals 204 provide a quality circumferential lip seal, unlike conventional methods that rely of the use of face seals and pressure-loaded gaskets. Associated with the seals 204 are a plurality of circular guide angle, flange or support rings 206 provided to backup the seals 204. The diameter of support rings 206 is smaller than the diameter of the interior wall 208 of the housing apparatus 100 and supports the filter element 202. The support rings 206 allow the housing apparatus 100 to be installed in any orientation without comprising seal integrity.

At the filter install end 104 of the housing apparatus 100, the end cover 110 can be opened for inserting clean HEPA filters 202. At the opposite or filter removal end 106 of the housing apparatus 100, a change-out bag 210 is sealed to the outside of the housing apparatus 100 for receiving the contaminated HEPA filter 202. The change-out bag 210 is a plastic bag attached to the outside wall of the removal end 106 of the housing apparatus 100 and has a selected length for one or more contaminated filters 202. As shown in FIG. 2, a flow path of gas through the housing apparatus 100 is directed so that the contaminated gas passes through the active HEPA filter 202 #1 only and the clean gas passes out of the housing without passing through the other HEPA filter 202 #2, ensuring that the backup filter remains clean.

A handle 212 is attached to each HEPA filter 202. As shown in FIG. 2, the filter handle 212 of the backup HEPA filter 202 #2 engages the active HEPA filter 202 #1. The function of the filter handles 212 is to locate the active filter 202 #1, to properly space the backup HEPA filter 202 #2 and the active HEPA filter 202 #1, to keep the backup HEPA filter 202 #2 from blocking exhaust, and to keep the change-out bag 210 from blocking the active HEPA filter 202 #1.

Figure 3:
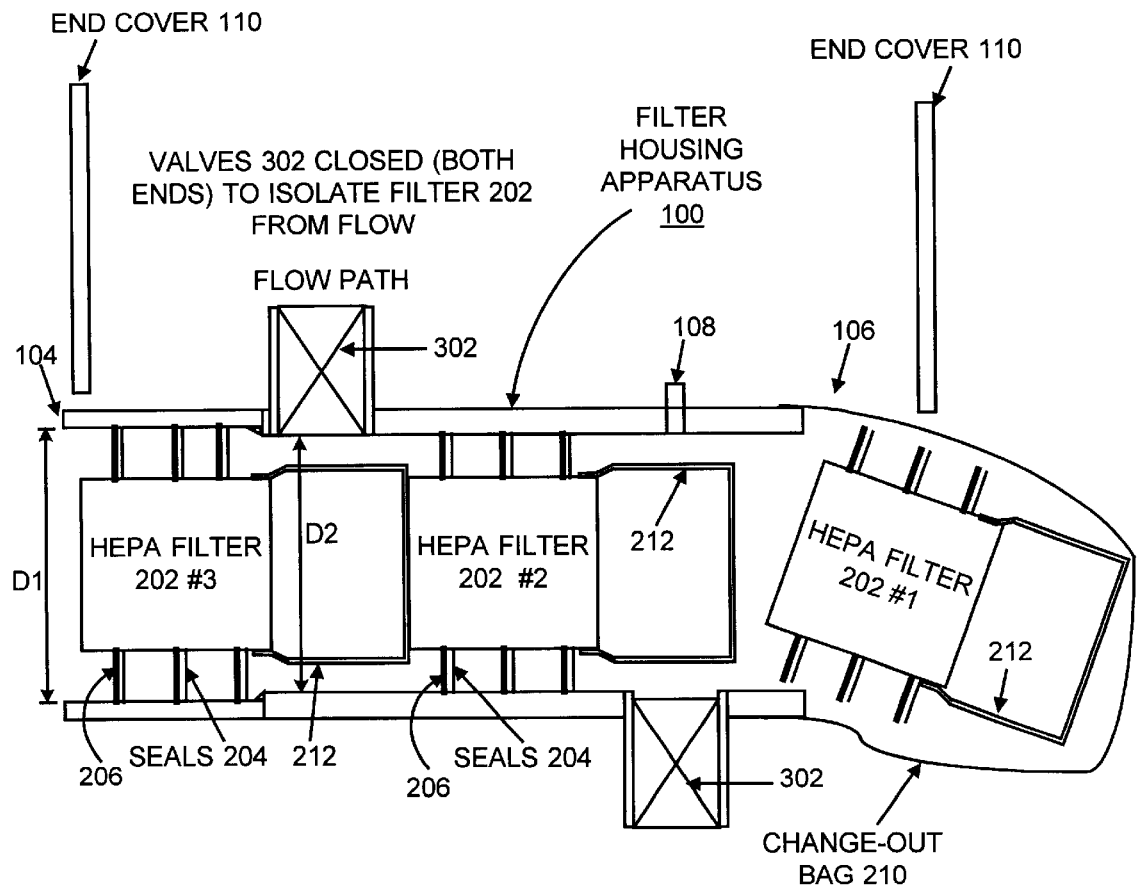
FIG. 3 is a diagrammatic view of the HEPA filter housing apparatus of FIG. 1 illustrating initial steps of a filter change procedure in accordance with the preferred embodiment.

Referring to FIG. 3, initial steps of a filter change procedure are illustrated in accordance with the preferred embodiment. As shown in FIG. 3, a pair of valves 302 on respective ends of the flow path are closed to isolate HEPA filter 202 from flow. Filter replacement involves opening the end covers 110 at the filter install end 104 and filter removal end 106, and opening the change-out bag 210. A replacement clean backup filter 202 #3 is used to push the in-place clean filter 202 #2 in the housing into the active filtration position. This clean filter 202 #2 in turn pushes the contaminated filter 202 #1 into the change-out bag 210. The downstream piping is not exposed to contamination.

As shown in FIG. 3, the interior filter receiving cavity 200 of the housing apparatus 100 has a stepped diameter. A first housing diameter indicated by an arrow labeled D1 at the filter install end 104 extending through the location of backup HEPA filter 202 #2 is larger than a second housing diameter indicated by an arrow labeled D2 extending through the location of the active HEPA filter 202 #1. This stepped diameter prevents the filter seals 204 from taking a set before the backup HEPA filter 202 becomes active.

Figure 4:
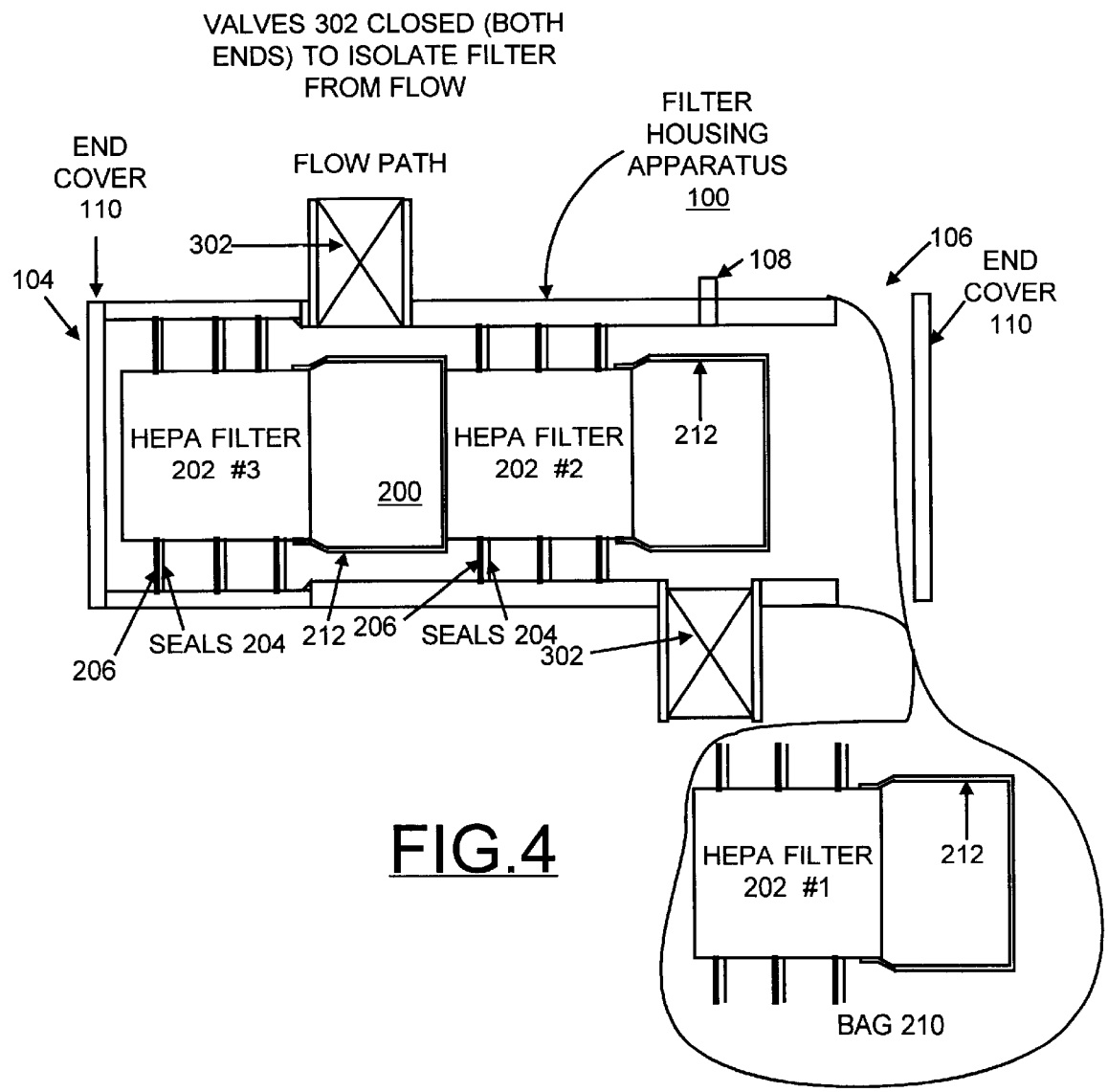
FIG. 4 is a diagrammatic view of the HEPA filter housing apparatus of FIG. 1 illustrating final steps of a filter change procedure in accordance with the preferred embodiment.

Referring to FIG. 4, final steps of a filter change procedure are illustrated in accordance with the preferred embodiment. The housing end cover 110 at the filter install end 104 of the filter housing apparatus 100 is closed. The contaminated filter 202 #1 is moved to the end of the change-out bag 210 where it is isolated and sealed off at the same time that the end of the change-out bag 210 is resealed. The isolated contaminated filter can now be removed for disposal and the remaining sealed change-out bag 210 can be rolled and stored in the filter removal end 106 of the filter housing apparatus 100. The change-out bag 210 can be of such length that it could contain a number of contaminated filters 202, so that the change-out bag 210 need only be replaced after a number of filter changes have taken place over several years time. The housing end cover 110 at the filter removal end 106 of the filter housing apparatus 100 is closed. The filter housing apparatus 100 is now closed and the valves 302 are opened to return to normal operation.

It should be understood that the present invention is not limited to the illustrated embodiment. For example, it should be understood that the filter housing apparatus 100 can be provided with sufficient length to hold more than two circular HEPA filters 202 in tandem.

While the present invention has been described with reference to the details of the embodiments of the invention shown in the drawing, these details are not intended to limit the scope of the invention as claimed in the appended claims.

What is claimed is:

1. Apparatus for the replacement of a contaminated HEPA filter without contamination of the surrounding environment comprising:

a filter housing, said filter housing being generally cylindrical and defining a filter receiving cavity, said filter housing having a filter receiving end and an filter removing end;

an active HEPA filter received within said filter housing cavity and located near said filter removing end;

a backup HEPA filter received within said filter housing cavity and located near said filter receiving end;

a change-out bag sealed to said filter housing and stored adjacent to said filter removing end; said change-out bag for receiving the contaminated active HEPA filter during filter replacement without contamination of the surrounding environment; and said filter housing including a gas flow path through said active HEPA filter without passing through said backup HEPA filter; said active HEPA filter being received in sealed engagement with said filter housing cavity to prevent gas flow from bypassing said active HEPA filter; and said gas flow path being closed during filter replacement for replacing said active HEPA filter without contamination of an upstream portion of said gas flow path.

2. Apparatus for the replacement of a contaminated HEPA filter without contamination of the surrounding environment as recited in claim 1 wherein said active HEPA filter and said backup HEPA filter are cylindrical HEPA filters and each HEPA filter including a plurality of seals; and said seals are formed of elastomer material and providing said sealed engagement between said active HEPA filter and said filter housing cavity.

3. Apparatus for the replacement of a contaminated HEPA filter without contamination of the surrounding environment as recited in claim 2 wherein said seals are cylindrical members extending between said HEPA filter and an interior wall of said filter housing; said filter receiving cavity having a first diameter at said backup HEPA filter and a second diameter at said active HEPA filter; and said first diameter is larger than said second diameter; and said seals of said active HEPA filter providing a circumferential lip seal preventing said gas flow from bypassing said active HEPA filter.

4. Apparatus for the replacement of a contaminated HEPA filter without contamination of the surrounding environment as recited in claim 1 wherein each of said active HEPA filter and said backup HEPA filter includes a filter handle; said filter handles for properly spacing said active HEPA filter and said backup HEPA filter within said filter housing.

5. Apparatus for the replacement of a contaminated HEPA filter without contamination of the surrounding environment as recited in claim 3 further includes a plurality of support rings associated with said seals; said support rings having a smaller diameter than said second diameter of said filter receiving cavity at said active HEPA filter; and said support rings enabling said filter housing to be installed in any orientation and maintaining said circumferential lip seal.

6. Apparatus for the replacement of a contaminated HEPA filter without contamination of the surrounding environment as recited in claim 3 wherein said first diameter is larger than said second diameter for preventing said backup HEPA filter from forming said circumferential lip seal.

7. Apparatus for the replacement of a contaminated HEPA filter without contamination of the surrounding environment as recited in claim 1 wherein said filter housing includes a test aerosol introduction port for allowing testing of filter integrity while said active filter is being used.

8. Apparatus for the replacement of a contaminated HEPA filter without contamination of the surrounding environment as recited in claim 1 includes a pair of valves for closing said gas flow path during filter replacement.

9. Apparatus for the replacement of a contaminated HEPA filter without contamination of the surrounding environment as recited in claim 1 includes a pair of end covers closing said filter receiving end and said filter removing end during normal operation, said end covers being removed during filter replacement.

10. Apparatus for the replacement of a contaminated HEPA filter without contamination of the surrounding environment as recited in claim 1 wherein said backup HEPA filter is pushed into position of said active HEPA filter thereby moving said active HEPA filter into said change-out bag during filter replacement.

11. Apparatus for the replacement of a contaminated HEPA filter without contamination of the surrounding environment as recited in claim 9 wherein a new backup HEPA filter is inserted and said end covers are closed.

12. Apparatus for the replacement of a contaminated HEPA filter without contamination of the surrounding environment as recited in claim 10 wherein said change-out bag is sealed to isolate said HEPA filter for disposal.

13. Apparatus for the replacement of a contaminated HEPA filter without contamination of the surrounding environment as recited in claim 1 wherein said change-out bag is a plastic bag and has a selected length for a number of contaminated HEPA filters.

14. A method for the replacement of a contaminated HEPA filter without contamination of the surrounding environment comprising the steps of:
providing a cylindrical filter housing apparatus defining a filter receiving cavity, said filter housing having a filter receiving end and a filter removing end and each including an end cover;
providing an active HEPA filter in said filter receiving cavity located near said filter removing end;
providing a backup HEPA filter received within said filter housing cavity located near said filter receiving end;
said cylindrical filter housing providing a gas flow path through said active HEPA filter without passing through said backup HEPA filter;
closing said gas flow path during filter replacement for replacing said active HEPA filter without contamination of an upstream portion of said gas flow path;
providing a change-out bag received within said filter housing cavity and located adjacent said filter removing end for receiving the contaminated active HEPA filter during filter replacement without contamination of the surrounding environment;
removing said end covers; and
pushing said backup HEPA filter into position of said active HEPA filter, moving said active HEPA filter into said change-out bag during filter replacement for replacing said active HEPA filter without contamination of the surrounding environment.

15. A method for the replacement of a contaminated HEPA filter without contamination of the surrounding environment as recited in claim 14 further includes the step of sealing said change-out bag to isolate said HEPA filter for disposal.

16. A method for the replacement of a contaminated HEPA filter without contamination of the surrounding environment as recited in claim 14 further includes the step of providing said HEPA filters with multiple elastomer material seals extending between each said HEPA filter and an interior filter housing wall to prevent gas flow from bypassing said active HEPA filter.

17. A method for the replacement of a contaminated HEPA filter without contamination of the surrounding environment as recited in claim 16 further includes the step of providing a plurality of support rings, each associated with a respective one of said seals, said support rings having a diameter smaller than said filter receiving cavity.

18. A method for the replacement of a contaminated HEPA filter without contamination of the surrounding environment as recited in claim 14 further includes the step of providing a test aerosol introduction port in said filter housing for allowing testing of filter integrity while said active filter is being used.

19. A method for the replacement of a contaminated HEPA filter without contamination of the surrounding environment as recited in claim 14 further includes the step of providing a pair of valves in a gas flow path and closing said valves for closing said gas flow path during filter replacement.

20. A method for the replacement of a contaminated HEPA filter without contamination of the surrounding environment as recited in claim 14 further includes the step of inserting a new backup HEPA filter within said filter housing cavity located near said filter receiving end and closing said end covers to complete the filter replacement.

* * * * *